United States Patent Office 3,111,373
Patented Nov. 19, 1963

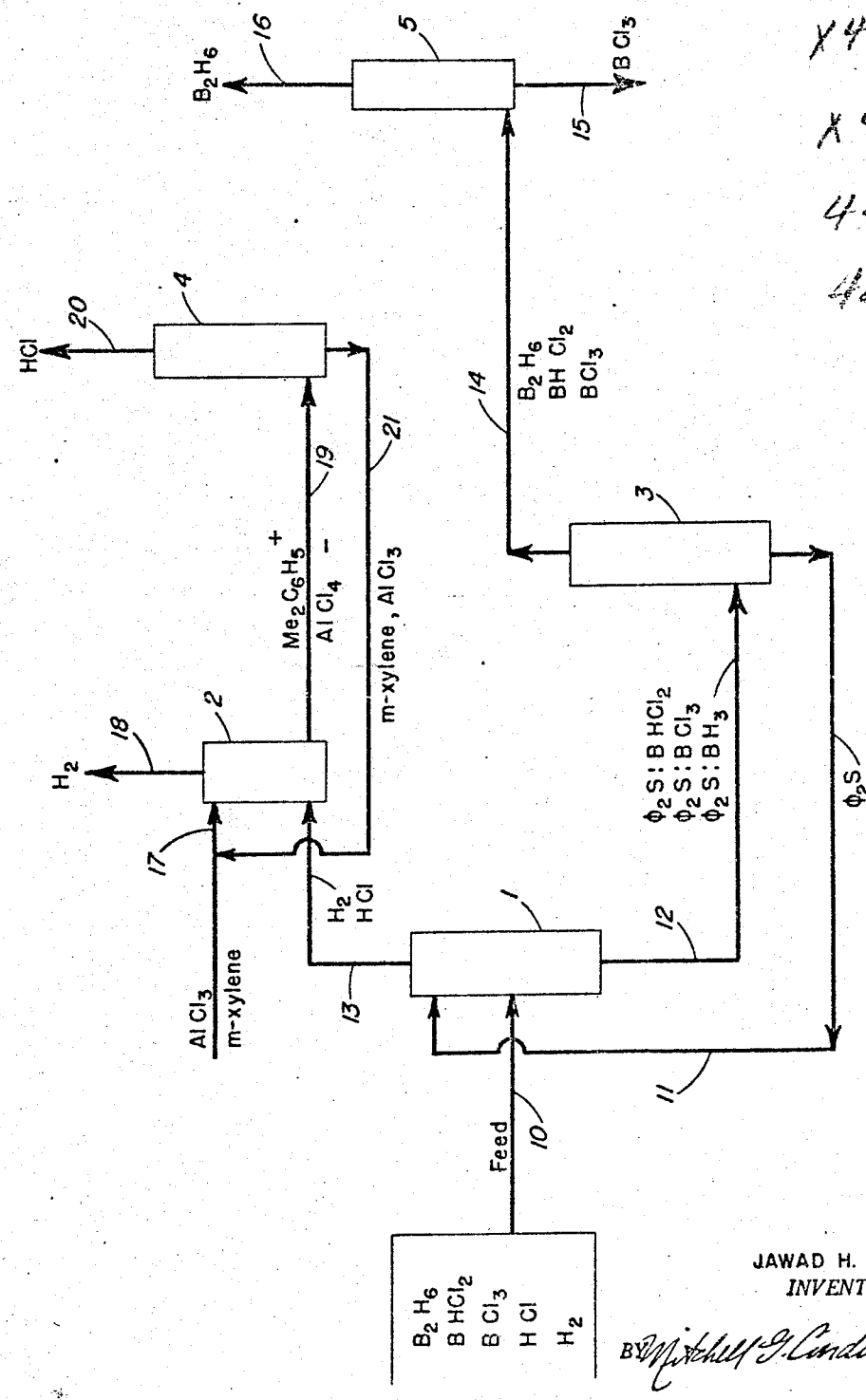

3,111,373
SEPARATION AND RECOVERY PROCESS
Jawad H. Murib, St. Bernard, Ohio, assignor to National Distillers and Chemical Corporation, New York, N.Y., a corporation of Virginia
Filed May 12, 1959, Ser. No. 812,643
7 Claims. (Cl. 23—14)

The present invention relates to a novel process for separation and recovery of components from mixtures comprising hydrogen, hydrogen halides, boron trihalide, and haloboron hydrides, and which may also contain diborane. More particularly, the invention relates to separation and recovery of components of reaction product mixtures obtained by reacting boron trichloride with hydrogen to provide mixtures of chloroboron hydrides, boron trichloride, hydrogen chloride, hydrogen and diborane, such as may be produced from processes described in copending applications, Serial No. 744,348, filed June 25, 1958, and Serial No. 748,156, filed July 14, 1958, entitled "Preparation of Boron Compounds."

In broad aspect, the invention embodied herein comprises (1) subjecting a substantially anhydrous mixture comprising haloboron hydride, hydrogen, hydrogen halide and boron trihalide and which mixture may also contain diborane, to contact with an organic sulfide from the group consisting of aryl and alkyl aryl sulfide that selectively complexes the boron-containing compounds in said mixture without complexing the hydrogen halide and hydrogen, (2) dissociating the resulting complex to liberate the boron-containing compounds, (3) disproportionating the mixture of liberated boron-containing compounds from (2) to a mixture of diborane and boron trihalide from which the diborane is separated, and (4) separating the mixture of hydrogen and hydrogen halide (from step (1)) into its components. In reference to step (4), such a separation can be effected by any of several means and, for example, by passing the mixture of hydrogen and hydrogen halide through an aqueous medium (e.g., water) whereby the hydrogen halide is absorbed. In another embodiment, the mixture of hydrogen and hydrogen halide can be contacted with a suitable metal halide in combination with a suitable ether or alkylaryl hydrocarbon, as defined more fully hereinatfer, to selectively complex the hydrogen halide and, following removal of the uncomplexed hydrogen, dissociating the complex of the hydrogen halide with said metal halide and ether or alkylaromatic hydrocarbon to liberate the hydrogen halide. In a continuous process, the sulfide liberated in step (2) is recycled to step (1).

In order to further describe the process embodied herein, reference is made to the accompanying flow sheet which, for purposes of illustration and not limitation, illustrates an embodiment of the process with specific utilization of the starting mixtures and reactants shown in the flow sheet.

A feed mixture comprising $B_2H_6$, $BHCl_2$, $BCl_3$, HCl and $H_2$ is passed into vessel 1 via line 10 into which diphenyl sulfide is fed via line 11. In vessel 1, the feed mixture contacts the diphenyl sulfide whereupon the latter selectively complexes all of the boron-containing compounds in the feed to form a diphenyl sulfide complex of $BHCl_2$, of $BCl_3$ and of $B_2H_6$, which is withdrawn from vessel 1 via line 12, the mixture of $H_2$ and HCl which is not complexed being withdrawn via line 13 from vessel 1. The complexes of the diphenylsulfide and boron-containing compounds in line 12 are subjected to a dissociation treatment in vessel 3 whereby the diphenyl sulfide is liberated and recycled to vessel 1 via line 11. The liberated mixture of boron-containing compounds is withdrawn from dissociation tower 3 via line 14 and passed to distillation tower 5 wherein the mixture is disproportionated to form $B_2H_6$ and $BCl_3$, the $BCl_3$ being withdrawn via line 15 as the residue from the disproportionating treatment in tower 5 and the $B_2H_6$ as the distillate via line 16. The mixture of $H_2$—HCl in line 13 is passed into vessel 2 to which is fed, via line 17, a suitable metal halide (e.g., $AlCl_3$) in mixture with an ether or an alkylaromatic hydrocarbon (e.g., meta-xylene).

In vessel 2, the HCl in the HCl—$H_2$ mixture is selectively complexed by the $AlCl_3$-meta-xylene complex, and the hydrogen is withdrawn via line 18, and the complex of the HCl with the metal halide-meta-xylene is removed via line 19. The latter complex passed into tower 4, is dissociated to liberate the HCl which is removed via line 20, and the liberated aluminum chloride-meta-xylene is recycled via line 21 to line 17 into tower 2. In such a manner, the components of the starting feed material introduced into vessel 1 are separated and recovered as valuable products (i.e., diborane, hydrogen, $BCl_3$ and HCl) and the substances used for effecting such a result, namely the diaryl sulfide (e.g., diphenylsulfide), $AlCl_3$ and ether or alkylaromatic hydrocarbon (e.g., meta-xylene) are also recovered in substantially quantitative and substantially pure form for reuse in the process.

In step (1), wherein the boron-containing components are selectively complexed with the organic sulfide, the starting mixture is contacted with the sulfide in an amount substantially stoichiometrically equivalent to, or in excess of (such as up to about seven molar equivalents or more of the sulfide) the amount required to complex the boron-containing compounds present in the starting mixture. Preferably, diphenyl sulfide is used as the diaryl sulfide. However, other sulfides such as ditolyl sulfide, phenyl tolyl sulfide, ethyl phenyl sulfide, methyl phenyl sulfide may be used. The contact of the starting mixture by the sulfide is carried out at a temperature up to about 50° C. but substantially lower temperatures are preferred, such for example, from about —10° C. up to about 25° C. In preferred embodiment, step (1) is carried out at atmospheric or slightly elevated pressure such as up to about twenty atmospheres although that step can be carried out at any pressure higher than the dissociation pressure of the sulfide complexes at the temperature employed.

In step (2), wherein the complex of the sulfide with the boron-containing compounds is subjected to dissociation, the dissociation may be accomplished by heating the complex to a temperature of from about 40 to 200° C., and preferably, from about 50 to 70° C. as, at such temperatures, substantially quantitative recovery of substantially pure sulfide and boron-containing compounds is effected. The liberated boron-containing compounds (e.g., $B_2H_6$, $BHCl_2$ and $BCl_3$), subjected to disproportionation wherein, for example, the $BHCl_2$ disproportionates to $B_2H_6$ and $BCl_3$ are so converted (i.e., step (3)) by heating, such as by use of total reflux in a fractionation column and, for example, from about 0° to about 50° C., followed by distillation to separate the $B_2H_6$ from $BCl_3$. The distillation treatment, for example, can be effectively carried out at two atmospheres pressure with reflux at about 0° C.

In step (4), wherein the $H_2$—HCl mixture from step (1) is separated into its components by use of the embodiment described with reference to the drawing, the mixture is contacted with a suitable metal halide in combination with an ether or an alkylaromatic hydrocarbon, the HCl is selectively complexed with use of a metal halide of the Lewis acid-type in combination with a suitable ether or alkylaromatic hydrocarbon to form complexes in which the partial pressure of the hydrogen chloride is negligible or substantially negligible at ordinary temperatures. For such a purpose, there is used halides of certain elements from group III-A, IV-A and V-A of the periodic table, and ferric chloride, in presence of a suitable organic solvent, including ethers, such as aliphatic ethers, chlorinated aliphatic ethers, aliphatic aromatic ethers, dialiphatic sulfides, aliphatic aromatic sulfides, etc. as well as certain hydrocarbons such as the alkylaryl hydrocarbons. In general, the ethers used for this purpose may be designated by the formula $$R_2Z$$

wherein Z is an element of group VI-A, i.e., oxygen, sulfur, selenium and tellurium, and which ethers have a volatility substantially lower than that of any gas in admixture with the HCl to be selectively complexed. Preferred are such ethers containing an aliphatic group of up to six carbon atoms as in dimethyl ether, diethyl ether, diisopropyl ether, dibutyl ether, diisobutyl ether, dihexyl ether, and others. Halogenated aliphatic ethers are likewise useful, as for example, bis-2-chloroethyl ether, bis-3-chloropropyl ether, etc. as well as certain alkylaryl ethers such as anisole, phenetole, and others. Sulfides, such as dialkyl sulfide and alkylaryl sulfides, may also be used. Such sulfides are those corresponding to the aforesaid oxygen-containing ethers except that the oxygen is replaced with sulfur. Also useful for such a purpose are alkylaryl hydrocarbons such as toluene, ethylbenzene, the xylenes, mesitylene, the durenes, and, in general, alkyl benzenes containing up to about six carbon atoms in the alkyl substituent.

The Lewis-type acids suitable for the aforesaid purpose are, in addition to ferric chloride and zinc chloride, the halides of certain elements from group III-A, group IV-A, and group V-A of the periodic table. Examples of such metal halides include $BF_3$, $BCl_3$, $AlCl_3$, $GaCl_3$, $InCl_3$, $TlCl_3$, $SnCl_4$, $PbCl_4$, $SbCl_5$ and $AsCl_5$, substances such as zinc chloride, antimony pentachloride, ferric chloride, stannic chloride and aluminum chloride being preferred.

For the selective complexing of, for example, the HCl from the $H_2$—HCl mixture, the amount of the complexing agent that is used in proportion to the solvent (e.g., ether, thioether, alkylaromatic hydrocarbon) is such that the hydrogen chloride is complexed but, preferably, the amount of the complexing agent and solvent is controlled such as to complex substantially all of the hydrogen chloride while obviating or minimizing the use of substantial excess of the complexing agent and solvent and of the latter two substances an excess of the solvent is, in most cases, not particularly disadvantageous.

The complex formation of, for example, the HCl can be carried out at temperatures up to about room temperature; that is, up to about 25° C. but, preferably, at substantially lower temperatures such as about 0° C. with particularly suitable results being obtained by use of temperatures of from about −30° C. to about 0° C. The complex formation can be carried out at any pressure higher than the dissociation pressure of the complex at the temperature employed.

The complex formed with the hydrogen chloride is treated, for liberation of the HCl, by heating the complex. That is, the complex can be heated to from about 50 to about 200° C. with a more preferred temperature being from 75 to about 150° C. Any pressure may be used which is lower than the dissociation pressure of the complex at the temperature being used for the desorption. However, a preferred method is to employ pressures of approximately one atmosphere or lower in order to avoid excessive temperatures. In general, however, the complex is heated to a temperature sufficient to cause desorption of the hydrogen halide in substantially pure form.

In practice of this invention, and in reference to step (1) the use of the aforesaid sulfides rather than dialiphatic sulfides provides markedly improved results as the use of dialiphatic sulfides decompose extensively during thermal dissociation of the complex thereof with boron-containing compounds. Thus, and when diborane is also present in the starting mixture, it complexes with the diaryl sulfide to provide a weaker complex than that formed with the boron halides and haloboron hydrides. Such a complex may, however, be dissociated quantitatively without decomposition to liberate the diborane. On the other hand, the diborane complex with dialiphatic sulfides decomposes incompletely and only a portion of the diborane is liberated.

In order to still further describe the invention, the following embodiments are set forth for purposes of illustration and not limitation.

*Example 1*

A gaseous reaction mixture (273.1 mmoles) composed essentially of 92.7% $H_2$, 3.9% $BCl_3$, 1.6% $BHCl_2$, 1.6% HCl and a trace amount of diborane., was maintained at room temperature and a pressure of 825 mm Hg. The gaseous mixture was bubbled through a solution at 0° C. of 12.7 mmoles of diphenyl sulfide and 2 grams of a saturated aliphatic (hydrocarbon) oil. The diphenyl sulfide solution retained substantially all of the boron-containing compound in the gaseous mixture while the $H_2$ and HCl passed through the solution. The effluent gases were passed through U-tubes maintained at −196° C. to condense volatile materials carried over with the hydrogen. The diphenyl sulfide solution was heated at 80–100° C. under reduced pressure (10 mm.) whereby $BHCl_2$ and $BCl_3$ were generated. Hydrolysis of the diphenyl sulfide-desorbate and the effluent gas condensate, followed by determination of the hydrogen evolved, gave the results shown in the following table:

I

| Initial Mixture [1] | Diphenyl sulfide desorbate | Effluent Gas |
|---|---|---|
| $BVl_3$ | 10.76 | 9.26 | 1.5 |
| $BHCl_2$ | 4.34 | 4.34 | 0.0 |
| HCl | 4.34 | 0.0 | 4.34 |
| $H_2$ | 253 | 0.0 | |

[1] Quantities are expressed in millimoles.

The $BCl_3$ and $BHCl_2$ desorbed from the diphenyl sulfide were condensed as a liquid at 0° C. and heated under 2 atmospheres pressure to disproportionate the $BHCl_2$ as follows:

$$6HBCl_2 \rightleftharpoons 4BCl_3 + B_2H_6$$

A reflux temperature of 0° C. was maintained and diborane was taken off continually, thereby shifting the reaction to the right. The overhead gas was passed through a −112° C. trap and the resulting gas was found to be very substantially pure diborane as evidenced by infrared spectral analysis.

To illustrate the recovery of hydrogen chloride from the hydrogen stream, a mixture consisting of 11.41 millimoles hydrogen chloride (v.t.=126 mm. at −112° C.) and 47.3 millimoles hydrogen, maintained at one atmosphere and 24.5° C. was bubbled through a solution of 7.58 millimoles anhydrous ferric chloride and 5.0 ml. $\beta,\beta'$-dichloroethyl ether held at 0° C. The effluent gas was scrubbed with distilled water, and found to contain 1.96 millimoles HCl as shown by titration of the scrubbing water with standard alkali. The ferric chloride etherate solution containing the complexed hydrogen chloride was then attached to a vacuum apparatus. Heating and evacuating at 70° C. for about one hour, and passing the gas evolved through traps maintained at −80 and −196° C. resulted in the recovery of 9.44 millimoles of pure hydrogen chloride (vapor tension 125 mm. at −112° C.) as a condensate in the −196° trap. The observed high ratio of HCl/$FeCl_3$ in solution (9.44/7.58=1.24) was attributed to the solubility of hydrogen chloride in the $\beta,\beta'$-dichloroethyl ether in addition to complex formation.

Example II

In another run, carried out as described in Example I, there was used 21.5 moles of diphenyl sulfide and 5.1 grams of the saturated aliphatic hydrocarbon oil. The results obtained are set forth in the following table:

II

| Initial Mixture, millimoles | | Diphenyl sulfide desorbate | Effluent Gas |
|---|---|---|---|
| $BCl_3$ | 10.04 | 7.95 | 1.99 |
| $BHCl_2$ | 3.40 | 3.40 | 0.0 |
| $HCl$ | 3.90 | 0.0 | 3.90 |
| $H_2$ | 247 | 0.0 | --------- |

In this run, the diphenyl sulfide desorbate was treated in the manner of that in Example I whereby diborane was obtained follownig the disproportionation and fractionation steps.

To illustrate the recovery of hydrogen chloride from the hydrogen stream, a mixture consisting of 8.17 millimoles hydrogen chloride and hydrogen was placed in a liter flask held at 760 mm. Hg and 25° C. This mixture was treated in the same manner employed in Example I except that the complexing reagent was made up to 17.6 millimoles anhydrous aluminum chloride and 18.2 millimoles of mesitylene. The hydrogen chloride was substantially retained as a complex of low volatility, allowing the hydrogen to pass through the reagent in substantially pure form. Desorption of the hydrogen chloride at 100° C. with pumping resulted in the recovery of 87% of that originally present in the sample.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process for separation and recovery of components of a substantially anhydrous mixture comprising hydrogen, hydrogen chloride, boron trichloride and chloroboron hydrides which comprises (1) contacting said substantially anhydrous mixture with a diaryl sulfide at temperatures below 50° C. that selectively complexes the boron-containing components in said mixture to provide a mixture of said sulfide complexes of said boron-containing components and a non-complexed mixture of hydrogen and the hydrogen chloride, (2) thermally dissociating at a temperature of from about 40 to 200° C., the mixture of sulfide complexes from step (1) to liberate the sulfide and a mixture of the boron-containing components, (3) thermally disproportionating at a temperature from about 0° to about 50° C., the mixture of boron-containing components liberated in step (2) to provide a mixture of boron trichloride and boron hydrides and removing by distillation the boron hydrides from the resulting disproportionated mixture, and (4) separating by volatilization the hydrogen from the hydrogen chloride after conversion of the hydrogen chloride to a complex in which the partial pressure of the hydrogen chloride is substantially negligible at ordinary temperatures, in the mixture thereof obtained in step (1).

2. A process for separation and recovery of components of a substantially anhydrous mixture comprising hydrogen, hydrogen chloride, boron trichloride and chloroboron hydrides which comprises (1) contacting said substantially anhydrous mixture with a diaryl sulfide at temperatures below 50° C. that selectively complexes the boron-containing components in said mixture to provide a mixture of said sulfide complexes of said boron-containing components and a non-complexed mixture of hydrogen and the hydrogen chloride, (2) thermally dissociating at a temperature of from about 40 to 200° C., the mixture of sulfide complexes from step (1) to liberate the sulfide and a mixture of the boron-containing components, (3) thermally disproportionating at a temperature of from about 0° to about 50° C., the mixture of boron-containing components liberated in step (2) to provide a mixture of boron trichloride and boron hydrides and removing by distillation the boron hydrides from the resulting disproportionated mixture, (4) contacting the mixture of hydrogen and hydrogen chloride at a temperature of from about −30° C. up to about 25° C. from step (1) with a complex formed by a Lewis acid-type halide selected from the group consisting of halides of boron, aluminum, gallium, indium, thallium, tin, lead, antimony, and arsenic, ferric chloride and zinc chloride with a complexing agent from the group consisting of compounds of the formula $R_2Z$ when R is hydrocarbon and Z is from the group consisting of (1) oxygen, sulfur, selenium and tellurium and (2) alkyl aryl hydrocarbons to selectively complex the hydrogen chloride, and (5) dissociating by heating at from about 50 to about 200° C. the complex of the hydrogen chloride produced in step (4) to liberate the hydrogen chloride from the Lewis acid halide complexing agent.

3. A process, as defined in claim 2, wherein the sulfide liberated in step (2) is recycled to step (1) and the Lewis acid type halide and complexing agent liberated in step (5) is recycled to step (4).

4. A process, as defined in claim 2, wherein the substantially anhydrous mixture initially contains diborane.

5. A process, as defined in claim 2, wherein the anhydrous mixture initially contains diborane, the diaryl sulfide is diphenyl sulfide, the Lewis acid halide is from the group consisting of aluminum chloride and ferric chloride, and the complexing agent for the Lewis acid halide is from the group consisting of $\beta,\beta'$-dichloroethyl ether and mesitylene.

6. A process for separation and recovery of a substantially anhydrous mixture comprising $H_2$, $BCl_3$, $BHCl_2$, HCl and $B_2H_6$ which comprises (1) contacting said mixture at below about 25° C. with diphenylsulfide in an amount at least stoichiometrically sufficient to selectively complex the boron-containing components in said anhydrous mixture to provide a diphenylsulfide complex mixture and a mixture of hydrogen and HCl, (2) heating the diphenylsulfide complex mixture from step (1) to from about 40 to about 100° C. to liberate the diphenylsulfide from the complex thereby liberating a mixture of $B_2H_6$, $BHCl_2$ and $BCl_3$, (3) disproportionating to $B_2H_6$ and $BCl_3$ the mixture of $B_2H_6$, $BHCl_2$ and $BCl_3$ from step (2) by subjecting said mixture to a temperature of from about 0° to about 50° C. with removal of the $B_2H_6$ from the $BCl_3$ by distillation, (4) recycling to step (1) the diphenylsulfide liberated in step (2), (5) contacting the $H_2$—HCl mixture from step (1) with a complex formed by (a) a Lewis acid halide from the group consisting of ferric chloride and aluminum chloride with (b) a complexing agent from the group consisting of mesitylene and $\beta,\beta'$-dichloroethyl ether, said $H_2$–HCl mixture being contacted at a temperature below about 25° C. with an amount of said Lewis acid halide complex sufficient to complex substantially all the HCl in said mixture, (6) liberating the HCl from the HCl-complexed mixture formed in step (5) by heating said mixture to from about 50 to about 200° C., and (7) recycling the liberated Lewis acid halide-complexing agent from step (6) to step (5).

7. A process for separation and recovery of components of a substantially anhydrous mixture comprising hydrogen, a hydrogen halide, a boron trihalide and haloboron hydrides which comprises (1) contacting said substantially anhydrous mixture at a temperature up to about 50° C. with an organic sulfide from the group consisting of aryl and alkyl aryl sulfides that selectively complexes the boron-containing components in said mixture in amount at least substantially stoichiometrically sufficient to complex the boron-containing components in the anhydrous mixture, to provide a mixture of said sulfide complexes of said boron-containing components and a non-complexed mixture of hydrogen and the hydrogen halide, (2) dissociating the mixture of sulfide complexes from step (1) by heating at from about 40° C. to about 200° C., to liberate the sulfide and a mixture of the boron-containing components, (3) disproportionating the mixture of boron-containing components liberated in step (2) at from about 0 to 50° C., to provide a mixture of boron trihalide and boron hydrides and removing by distillation the boron hydrides from the resulting disproportionated mixture, (4) contacting at a temperature up to about 25° C. the mixture of hydrogen and hydrogen halide from step (1) with a complex formed by a stoichiometrically sufficient amount of a Lewis acid-type halide selected from the group consisting of halides of boron, aluminum, gallium, indium, thallium, tin, lead, antimony, and arsenic, ferric chloride and zinc chloride with a complexing agent from the group consisting of compounds designated by the formula $R_2Z$ wherein Z is an element selected from the group consisting of oxygen, sulfur, selenium, and tellurium, and R is a hydrocarbon radical to selectively complex the hydrogen halide, and (5) dissociating the complex of the hydrogen halide produced in step (4) by heating at from about 50° to about 200° C., to liberate the hydrogen halide from the Lewis acid halide complexing agent.

References Cited in the file of this patent

UNITED STATES PATENTS

| | | |
|---|---|---|
| 2,378,968 | Axe | June 26, 1945 |
| 2,537,076 | McCaulay et al. | Jan. 9, 1951 |
| 2,555,512 | Schlesinger et al. | June 5, 1951 |

OTHER REFERENCES

Baber et al.: "General College Chemistry," 1940, page 88.